United States Patent [19]

Hampton et al.

[11] Patent Number: 4,841,924
[45] Date of Patent: Jun. 27, 1989

[54] SEALED CAMSHAFT PHASE CHANGE DEVICE

[75] Inventors: Keith Hampton, Ann Arbor; Don J. Krzysik, Wixom; Glen R. Lilley, Livonia, all of Mich.

[73] Assignee: Eaton Corporation, Cleveland, Ohio

[21] Appl. No.: 233,703

[22] Filed: Aug. 18, 1988

[51] Int. Cl.$^4$ ................................................ F01L 1/34
[52] U.S. Cl. ............................... 123/90.15; 123/90.31; 123/90.17; 74/395; 464/2; 474/900
[58] Field of Search ............... 123/90.15, 90.17, 90.31; 74/395; 464/1, 2; 474/900

[56] References Cited

U.S. PATENT DOCUMENTS

| 3,626,720 | 12/1971 | Meacham et al. | 464/2 |
| 4,305,352 | 12/1981 | Oshima et al. | 123/90.15 |
| 4,498,431 | 2/1985 | Nakamura et al. | 123/90.15 |
| 4,561,390 | 12/1985 | Nakamura et al. | 123/90.15 |
| 4,754,727 | 7/1988 | Hampton | 123/90.15 |

FOREIGN PATENT DOCUMENTS 0715709 9/1954 United Kingdom ................. 464/2

Primary Examiner—Willis R. Wolfe
Assistant Examiner—Weilun Lo
Attorney, Agent, or Firm—P. S. Rulon

[57] ABSTRACT

A device (10) for varying the angular phase relation between a camshaft (12) and a crankshaft (unshown) in response to axial displacement of an advancing plate (20) drivingly connected to a support (16) via straight splines (16f) and a drive (18) via angled splines (18d). The support (16) is fixed to an end (12a) of the camshaft (12) for rotation therewith. The drive (18) is journaled on the support (16) and is driven by and in phase with the crankshaft. The advancing plate (20) is also threadably connected to a drum (36) via threads (20c, 36a) and the axial displacement is effected by relative rotation between the plate (20) and the drum (36). A clockspring (24) reacting between the support (16) and drum (36) tends to rotate the drum (36) faster than the plate (20) for positioning the plate (20) in a first limit position. The plate (20) is selectively movable from the first position toward a second limit position in response to selective application of a frictional retarding force to the drum by an actuation assembly (30). Intermediate plate positions (and of course intermediate phase relations of the camshaft (12) and crankshaft) are provided by balancing the spring and retarding forces. Further, the device contains an internal supply of lubricating oil sealed against leakage by covers (26,28) disposed at the axially facing ends of the device.

15 Claims, 4 Drawing Sheets 4,841,924

SEALED CAMSHAFT PHASE CHANGE DEVICE

FIELD OF THE INVENTION

This invention relates to a device for varying the angular phase relation between two rotating shafts. More specifically, the invention relates to such a device adapted to vary the angular phase relation between a camshaft and a crankshaft of an internal combustion engine.

BACKGROUND OF THE INVENTION

Devices for varying or changing the angular phase relation or timing between an engine camshaft and crankshaft are well known, as may be seen by reference to U.S. Pat. Nos. 3,626,720 and 4,754,727 which are both assigned to the assignee of this patent and which are both incorporated herein by reference.

The U.S. Pat. No. 3,626,720 to Meachem et al includes a helical ball spline mechanism for varying the phase relation in response to selective porting of engine oil pressure to axially displace a piston therein.

The U.S. Pat. No. 4,754,727 to Hampton discloses a device similar to the device herein, i.e., both include an axially displaceable advancing plate drivingly interconnecting support and drive members via straight and angular lugs or splines. The advancing plate is also threadably mounted on a drum for axial displacement along the drum in response to relative rotation between the drum and plate. Relative rotation in one direction is provided by a spring reacting between the hub and drum, and in the other direction by selective application of a frictional force for retarding rotation of the drum counter to the spring force.

A disadvantage of the devices in the above patents is that both require the use of engine oil; hence, they are limited to installation on engines designed to provide oil to the devices or on engines modified to provide the needed oil. A further disadvantage is that both allow the oil to freely flow over external surfaces of the device and therefore are not well suited for use with engines having camshafts driven by toothed belts which are preferably used in substantially oil free environments. A still further disadvantage with respect to the device of the U.S. Pat. No. 4,754,727 is that the electromagnetic actuator for retarding rotation of the frictionally engaged drum is exposed to the deleterious effects of friction generated heat from the drum.

SUMMARY OF THE INVENTION

An object of the present invention is to provide a sealed device for varying the angular phase relation between two rotating shafts and having a self-contained lubrication supply.

Another object of the present invention is to provide such a device which is relatively free of oil on its exterior surfaces.

Another object of the present invention is to provide a device for varying the angular phase relation between two rotating shafts and operated by an actuator assembly disposed external of the device.

Another object of the invention is to such a device for varying the angular phase relation between a camshaft and a crankshaft of an internal combustion engine.

According to a feature of the invention, an angular phase charge device such as disclosed in U.S. Pat. No. 4,754,727 is restructured and provided with sealing means to facilitate containment of a lubrication supply therein. The sealing means includes first and second annular, radially extending covers disposed on axially opposite sides of the device for defining a sealed annular space containing engaged and relatively movable portions. The covers each have a radially outer portion fixed to and statically sealed to opposite sides of a drive member of the device. The first cover has a radially inner portion in dynamic sealing relation with a portion of a drum assembly of the device and the second cover has a radially inner portion in dynamic sealing relation with a support member of the device.

According to another feature of the invention, an angular phase change device such as disclosed in U.S. Pat. No. 4,754,727 is provided with improved actuation means including friction means for engaging a friction surface of the device, an actuator disposed exterior of the device, and linkage means extending between the friction means and the actuator. The actuation means is operative in response energization of the actuator to move the friction means into engagement with the friction surface to retard rotation of a drum means relative to an advancing means, thereby effecting a threading action between the drum and advancing means.

BRIEF DESCRIPTION OF THE DRAWINGS

The camshaft phase change device of the present invention is shown in the accompanying drawing in which.

DETAILED DESCRIPTION OF THE DRAWINGS

Figure 1:
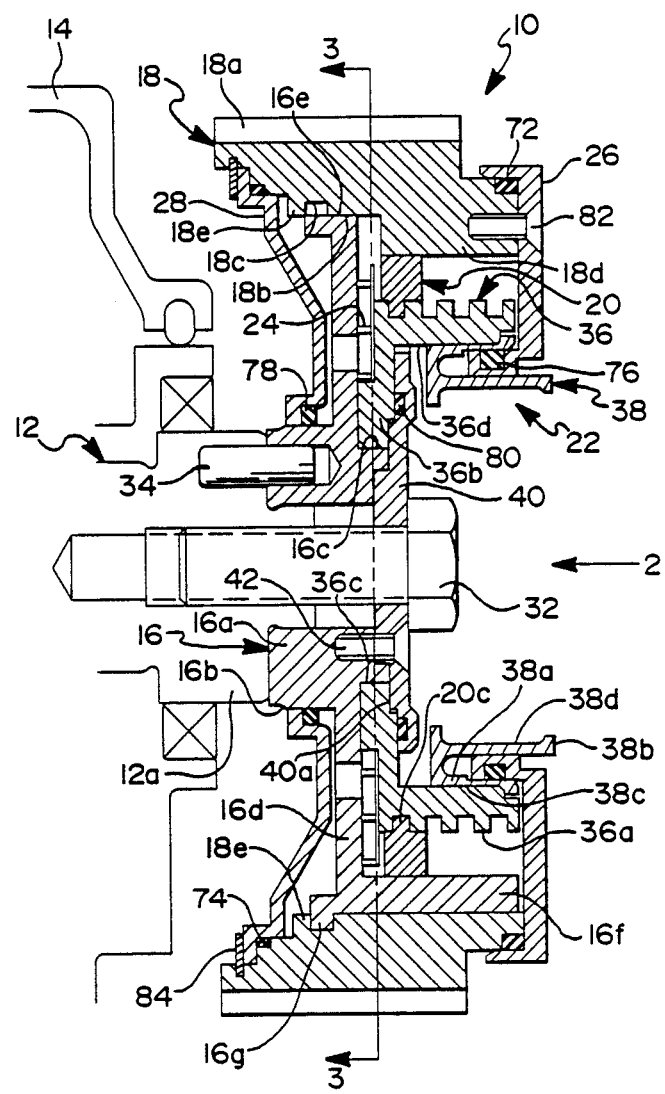
FIG. 1 is a staggered cross-sectional view of the device looking in the direction of arrows 1a–1a and 1b–1b in FIGS. 2 and 3.
Figure 2:
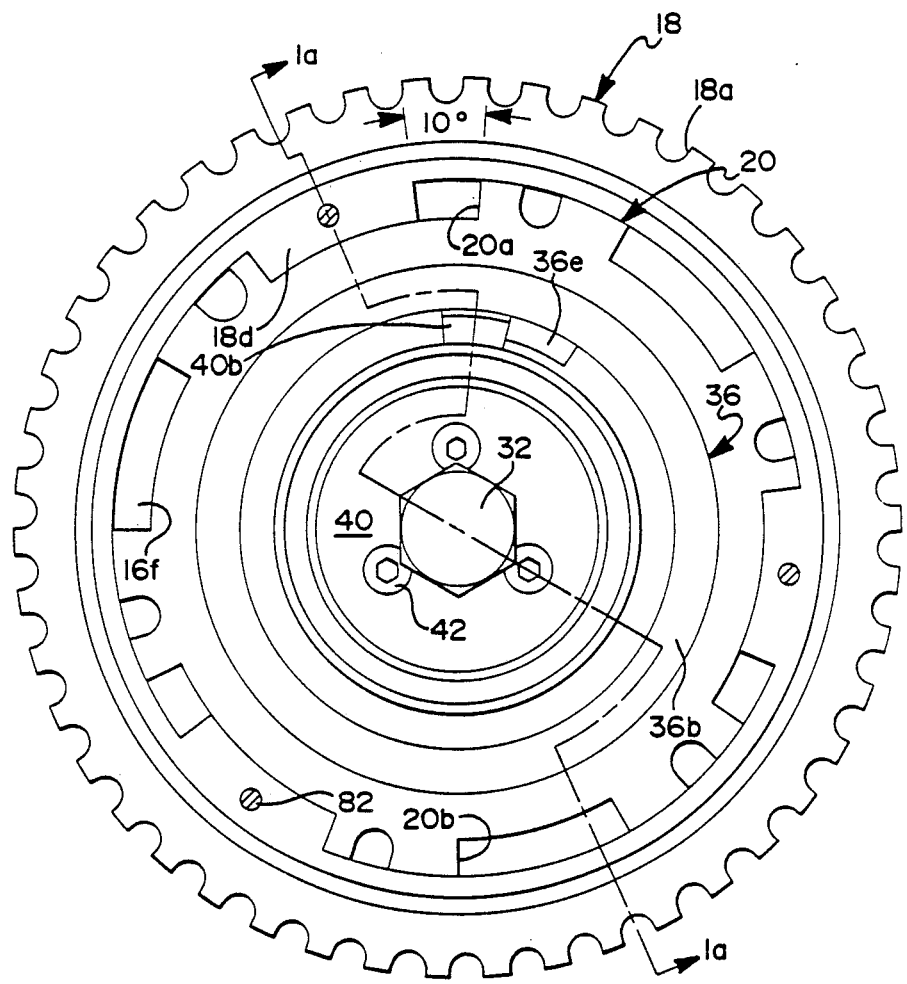
FIG. 2 is a face view of the device looking in the direction of arrow 2 in FIG. 1 with portions of the device removed.

Looking now at FIGS. 1-4, therein is shown an angular phase change device 10 adapted to be fixed to and rotate about the axis of a camshaft 12 of an internal combustion engine partially outlined at 14. The engine includes an unshown crankshaft which rotates device 10 and camshaft 12 in a clockwise direction when the device is viewed in the direction of FIG. 2. The camshaft controls opening and closing of unshown intake and/or exhaust valves of the engine in known manner. Device 10 includes a support member 16, a drive member 18, an advancing member or plate 20, a drum assembly 22, a clockspring 24, first and second annular end covers 26, 28, and an actuation assembly 30 shown only in FIG. 4.

Support member 16 includes a hub portion 16a having first and second outwardly facing cylindrical surfaces 16b,16c, and a flange portion 16d extending radially outward from the hub portion. The flange portion includes an outer cylindrical surface 16e, a set of three straight, circumferentially spaced apart lugs 16f extending axially therefrom, and a set of three radially extending ears 16g. The hub portion is axially fixed to an end 12a of the camshaft by a fastener such as bolt 32 which prevents axial and rotational movement therebetween The device is timed to the camshaft in known manner, herein a dowel pin 34 is used.

Drive member 18 is substantially annular in shape and is synchronously driven in fixed angular phase relation with the unshown crankshaft in known manner. Herein the drive is preferably via an unshown cogged belt which mates with cog teeth 18a on the outer periphery of the drive member. The radially inwardly facing portion of the drive member includes a cylindrical surface 18b journalled on surface 16e of the flange portion, an annular groove 18c slidably receiving ears 16g, and a set of three angled lugs 18d extending radially inward and circumferentially spaced apart. The side walls of groove 18c prevent relative axial movement of support and drive members 16,18. Ears 16g gain access to groove 18c via unshown arcuate openings in groove end wall 18e.

Advancing member or plate 20 includes a radially outer portion having sets of radially outwardly opening angled and straight slots 20a,20b respectively receiving the angled and straight lugs 18d,16f, and a radially inwardly facing portion having righthand helical threads 20c therein. The lugs and slots drivingly interconnect the support and drive members via the advancing plate and axial movement of the plate effects a limited amount of relative rotation between the support and drive members. The amount of relative rotation is determined by angled lugs 18d and angled slots 20a and by the axial distance the advancing member is moved. The device herein is configured to provide ten rotational degrees of relative rotation when the advancing member is moved from its leftward camshaft advance position of FIG. 1 to its rightward limit position.

Drum assembly 22 includes a drum member 36 and a friction member 38. Drum member 36 includes a radially outwardly facing portion having righthand helical threads 36a mating with advancing member threads 20c and a radially inwardly extending flange portion 36b having an inner cylindrical surface 36c journalled on hub surface 16c. Flange portion 36b is rotatably sandwiched between an axially facing surface of support member flange portion 16d and an axially facing surface 40a of an annular retaining plate 40 fixed to hub portion 16a by a plurality of screws 42 or other means. Retaining plate 40 includes a radially outwardly extending stop 40b which engages a stop 36e extending radially inward from drum 36. The stops limit rotation of the drum to less than 360° and therefore limit the amount of axial movement of advancing member 20. Friction member 38 includes concentric cylindrical portions 38a,38b. An outer cylindrical surface 38c of portion 38a is press fit into an inner cylindrical surface 36d of drum member 36. An inner cylindrical surface of portion 38b defines a friction surface 38d selectively engagable by friction shoes shown in FIG. 4 and further described hereinafter.

Figure 3:
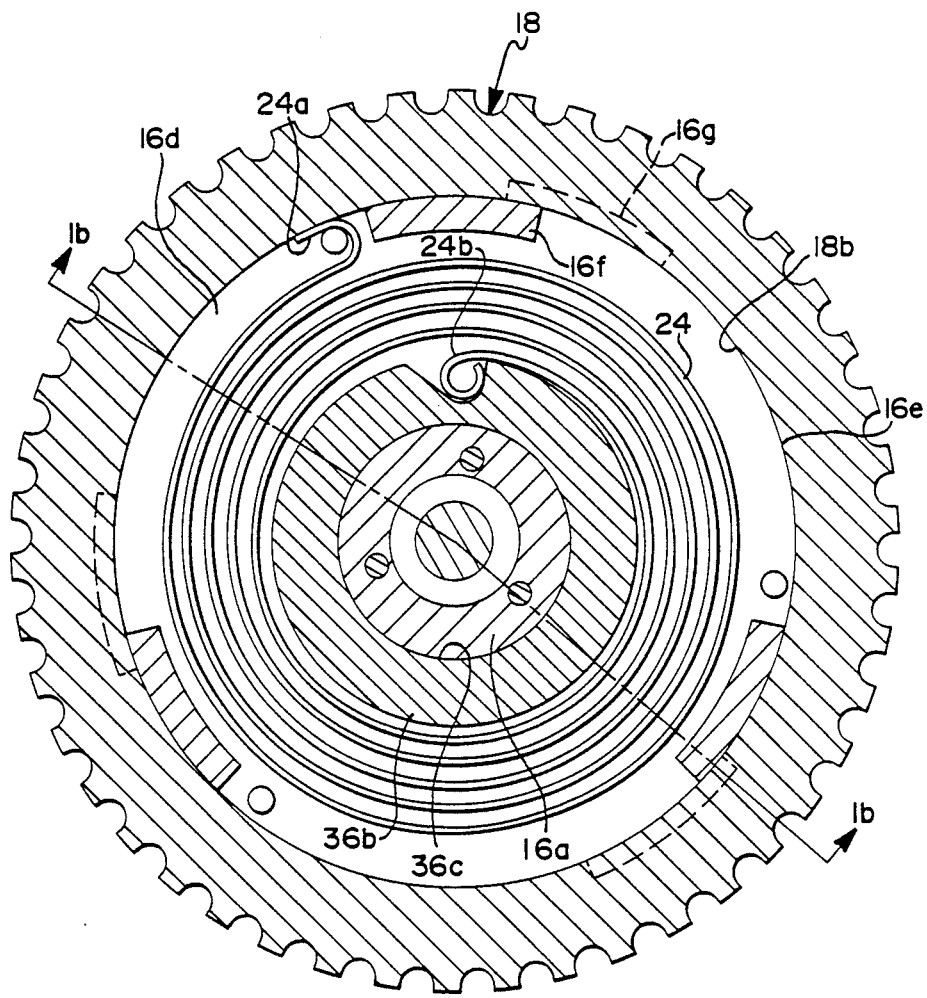
FIG. 3 is a sectional view looking in the direction of arrows 3—3 in FIG. 1.
Figure 4:
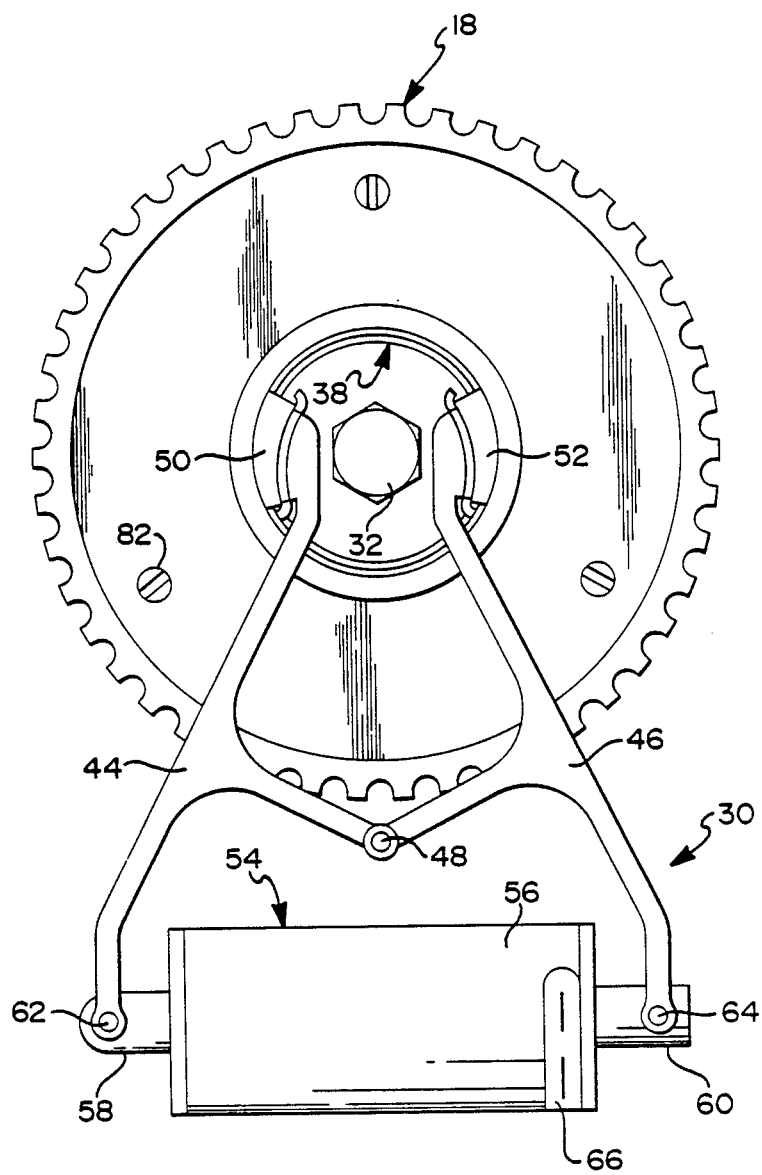
FIG. 4 is a reduced size face view of the device illustrating an actuation assembly for the device.

Clockspring 24, as shown in FIGS. 1 and 3, includes an outer end 24a secured to support member flange portion 16d and an inner end 24b secured to drum member flange portion 36b. An annular guide disk is inserted between the spring and drum member to maintain stacking of the spring coils. Spring 24 applies a clockwise biasing force or torque to drum 36 relative to the support flange 16d. In the absence of a retarding or friction braking force on friction surface 38d, the spring torque rotates the righthand threaded drum clockwise relative to advancing member 20, thereby axially moving the advancing member rightward as viewed in FIG. 1.

Actuator assembly 30 includes first and second elongated members or links 44,46 mounted for pivotal movement about a pin 48, brake shoes 50,52 affixed to the upper ends of the pivotal links, and an actuator 54. The actuator includes a housing 56 secured to the engine and having a movable plunger 58 extending from one end of the housing and a tang 60 fixed to the other end of the housing. The plunger axis is radially spaced outward of the radially outer extent of drive member 18 and is substantially normal to the axis of camshaft 12 and device 10. Plunger 58 and tang 60 are pivotally fixed, respectively to the other ends of the pivotal links by pins 62,64. The plunger moves inward of the housing in response to energization of the actuator and therefore moves the brake shoes radially outward with respect to the axis of device 10 and into frictional engagement with drum assembly friction surface 38d. Herein actuator 54 is of the electromagnetic type and includes a connector 66 for connection of an unshown, controllable power source such as disclosed in previously U.S. Pat. No. 4,754,727. Other known types of actuators and power sources may be used. The frictional force retards clockwise rotation of the drum and therefore is counter to the clockwise biasing force of clockspring 24. When the frictional retarding force is greater than the force of the clockspring, drum member 36 rotates counterclockwise relative to advancing plate 20 and moves the plate leftward to the camshaft advance position shown in FIG. 1. The advancing plate may be positioned in intermediate positions by balancing the spring and the frictional retarding forces.

Device 10, as thus far described, is operational when provided with adequate lubrication for engaged, moving parts therein Such lubrication may be provided by free flow of engine oil over the parts provided the camshaft drive means to the device and/or the device actuator are suitable for use in an oil environment. Such is not always desirable or preferable. Accordingly, device 10 is provided a self-contained oil supply by use of sealing means including the first and second annular, radially extending covers 26,28 disposed on axially opposite sides of the device, static seals 72,74, and dynamic seals 76,78,80. Static seals 72,74 respectively cooperate with radially outer portions of covers 26,28. Cover 26 is secured by a plurality of screws 82 or other means and cover 28 is non-rotatably secured by a retainer 84. A radially inner portion of cover 26 retains dynamic seal 76 which runs against a radially inwardly facing surface of friction member cylindrical portion 38a or surface 36d by shortening the axial length of portion 36a. A radially inner portion of cover 28 retains dynamic seal 78 which runs against hub surface 16b. Seal 80 is disposed in an annular groove in retaining plate 40 and runs against an axially facing surface of drum member flange portion 36b. Seals 76, 78 and 80 may be of the lip seal type and may run against any convenient surface that will provide necessary sealing.

A preferred embodiment of the invention has been disclosed for illustration purposes only. Many variations and modifications of the disclosed embodiment are believed to be within the spirit of the invention. The following claims are intended to cover inventive portions of the disclosed embodiment and variations and modifications within the spirit of the invention.

What is claimed is:

1. An annular phase change device comprising:
   support means adapted to be fixed to and rotate about an axis of a first shaft;

drive means journalled on the support means and secured thereto against axial movement, the drive means adapted to be driven by a second shaft;

advancing means including means drivingly interconnecting the support and drive means and operative in response to being moved axially to effect a limited relative rotation of the support and drive means;

drum means mounted for rotation about the axis and operative when rotated relative to the advancing means to effect the axial movement of the advancing means;

actuation means for effecting the relative rotation of the drum means;

sealing means including first and second annular, radially extending covers disposed on axially opposite sides of the device for defining a sealed annular space containing portions of the support, drive, advancing and drum means, said covers each having a radially outer portion fixed and statically sealed to opposite sides of the drive means, said first cover having a radially inner portion in dynamic sealing relation with the drum means, and said second cover having a radially inner portion in dynamic sealing relation with the support means.

2. The device of claim 1, wherein the support means includes an axially extending hub portion having an outer circumferential surface receiving the radially inner portion of the second cover and sealingly cooperating with a dynamic seal supported by the second cover.

3. The device of claim 1, wherein axial movement of the drum means relative to the support means is prevented by rotatably, sandwiching surfaces of drum means between surfaces axially fixed relative to the support means, and wherein leakage along one of the axially fixed surfaces is prevented by a dynamic seal.

4. The device of claim 1, wherein the support means includes a hub portion, the drum means includes a radially inner portion defining a friction surface axially spaced from the hub portion and exterior of the sealed annular space; and the actuating means includes friction means selectively engagable with the friction surface in response to energization of an actuator.

5. The device of claim 4, wherein the friction means applies a force retarding rotation of the drum relative to the advancing means for effecting an angular phase increase of the support means relative to the drive means, and wherein the device further includes spring means reacting between the support and drum means for rotating the drum means faster than the advancing means and effecting an angular phase decrease of the support means relative to the drive means.

6. The device of claim 4, wherein the friction surface is an inwardly facing cylindrical surface and the actuation means further includes linkage means for moving the friction means radially outward into engagement with the friction surface in response to energization of the actuator.

7. The device of claim 6, wherein the actuator includes a housing having first and second members extending from opposite ends of the housing, at least one of the actuator members being a plunger movable along an axis radially spaced outward of the radially outer extent of the drive means and substantially normal to the axis of the device, the plunger being movable along its axis in response to energization of the actuator; and the linkage means including first and second elongated members respectively extending between the actuator members and the friction means and pivotally supported therebetween.

8. The device of claim 1, wherein the support means includes a hub portion having a flange portion extending radially outward therefrom with an outer portion thereof for the journaling of the drive support means, the flange portion including a set of circumferentially spaced apart straight lugs extending therefrom; the drive means being generally annular in shape and including a set of inwardly directed angled lugs circumferentially spaced apart and disposed between the straight lugs; the advancing means being generally annular in shape and including a radially outer portion having sets of radially outwardly opening straight and angled slots respectively receiving the straight and angled lugs and including a threaded inner portion; and the drum means including a threaded out portion mating with the threaded inner portion of the advancing means, a radially inwardly extending flange portion having a cylindrical surface journalled on a cylindrical shoulder of the hub portion and having axially facing surfaces rotatably sandwiched between an axially facing surface of the support means flange portion and an axially facing surface of an annular retaining plate, and the adjacent surfaces of the drum means flange and annular plate sealed by dynamic seal means.

9. An annular phase change device comprising:

support means adapted to be fixed to and rotate about an axis of a first shaft;

drive means journalled on the support means and secured thereto against axial movement, the drive means adapted to be driven by a second shaft;

advancing means disposed radially inward of the drive means and including means drivingly interconnecting the support and drive means, the advancing means operative in response to being moved axially to effect a limited relative rotation of the support means;

drum means mounted for rotation about the axis and disposed radially inward of the advancing means, a radially outer surface of the drum means having helical threads receiving mating threads on a radially inner surface of the advancing means, and a radially inner portion of the drum means including a friction surface; and actuation means including friction means for engaging the friction surface, an actuator disposed exterior of the device, and linkage means extending between the friction means and actuator and operative in response to energization of the actuator to move the friction means into engagement with the friction surface for retarding rotation of the drum means relative to the advancing means to effect a threading action therebetween for axially moving the advancing means.

10. The device of claim 9, further including sealing means including first and second annular, radially extending covers disposed on axially opposite sides of the device for defining a sealed annular space containing portions of the support, drive, advancing, and drum means, said covers each having a radially outer portion fixed and statically sealed to opposite sides of the drive means, said first cover having a radially inner portion in dynamic sealing relation with the drum means, and said second cover having a radially inner portion in dynamic sealing relation with the support means.

11. The device of claim 10, wherein axial movement of the drum means relative to the support means is prevented by rotatably, sandwiching surfaces of drum means between surfaces axially fixed relative to the support means, and wherein leakage along one of the axially fixed surfaces is prevented by a dynamic seal.

12. The device of claim 9, wherein the device further includes spring means reacting between the support and drum means for rotating the drum means faster than the advancing means and effecting an angular phase decrease of the support means relative to the drive means.

13. The device of claim 9, wherein the friction surface is an inwardly facing cylindrical surface and the actuation means further includes linkage means for moving the friction means radially outward into engagement with the friction surface in response to energization of the actuator.

14. The device of claim 13, wherein the actuator includes a housing having first and second members extending from opposite ends of the housing, at least one of the actuator members being a plunger movable along an axis radially spaced outward of the radially outer extent of the drive means and substantially normal to the axis of the device, the plunger being movable along its axis in response to energization of the actuator; and the linkage means including first and second elongated members respectively extending between the actuator members and the friction means and pivotally supported therebetween.

15. The device of claim 9, wherein the support means includes a hub portion having a flange portion extending radially outward therefrom with an outer portion thereof for the journaling of the drive means, the flange portion including a set of circumferentially spaced apart straight lugs extending therefrom; the drive means being generally annular in shape and including a set of inwardly directed angled lugs circumferentially spaced apart and disposed between the straight lugs; the advancing means being generally annular in shape and including a radially outer portion having sets of radially outwardly opening straight and angled slots respectively receiving the straight and angled lugs and including a threaded inner portion; and the drum means including a threaded out portion mating with the threaded inner portion of the advancing means, a radially inwardly extending flange portion having a cylindrical surface journalled on a cylindrical shoulder of the hub portion and having axially facing surfaces rotatably sandwiched between an axially facing surface of the support means flange portion and an axially facing surface of an annular retaining plate, and the adjacent surfaces of the drum means flange and annular plate sealed by dynamic seal means.

* * * * *